(12) United States Patent
Xiao et al.

(10) Patent No.: US 11,214,728 B2
(45) Date of Patent: Jan. 4, 2022

(54) MODIFIED $MoS_2$ NANO MATERIAL, AND PREPARATION METHOD AND USE THEREOF

(71) Applicant: CHINA UNIVERSITY OF PETROLEUM—BEIJING, Beijing (CN)

(72) Inventors: Lizhi Xiao, Beijing (CN); Infant Raj, Beijing (CN); Guangzhi Liao, Beijing (CN)

(73) Assignee: CHINA UNIVERSITY OF PETROLEUM—BEIJING, Beijing (CN)

( * ) Notice: Subject to any disclaimer, the term of this patent is extended or adjusted under 35 U.S.C. 154(b) by 248 days.

(21) Appl. No.: 16/212,529

(22) Filed: Dec. 6, 2018

(65) Prior Publication Data
US 2020/0181478 A1 Jun. 11, 2020

(51) Int. Cl.
*E21B 43/16* (2006.01)
*C09K 8/588* (2006.01)
*C09K 8/584* (2006.01)
*C09C 1/00* (2006.01)

(52) U.S. Cl.
CPC ............ *C09K 8/584* (2013.01); *C09C 1/0003* (2013.01); *C09K 8/588* (2013.01); *E21B 43/16* (2013.01); *C01P 2002/82* (2013.01); *C01P 2004/03* (2013.01); *C01P 2004/04* (2013.01); *C01P 2004/24* (2013.01); *C09K 2208/10* (2013.01)

(58) Field of Classification Search
CPC ................................. C09K 8/584; E21B 43/16
USPC ...................................................... 166/305.1
See application file for complete search history.

(56) References Cited

U.S. PATENT DOCUMENTS

| 2014/0231145 A1* | 8/2014 | Kverel ................ C10M 125/22 175/65 |
| 2015/0060072 A1* | 3/2015 | Busby ...................... C09K 8/20 166/294 |
| 2016/0046501 A1* | 2/2016 | Kverel ..................... C01G 1/12 428/404 |

OTHER PUBLICATIONS

Hendrantngrat, Luky et al., "A coreflood investigation of nanofluid enhanced oil recovery" Journal of Petroleum Science and Engineering; vol. III; (2013); pp. 128-138.

* cited by examiner

*Primary Examiner* — Zakiya W Bates
*Assistant Examiner* — Ashish K Varma
(74) *Attorney, Agent, or Firm* — J.C. Patents

(57) ABSTRACT

The invention provides a modified $MoS_2$ nano material and a preparation method thereof. The modified $MoS_2$ nanomaterial is comprised of a hydrophilic $MoS_2$ nanosheet linked with hydrophobic alkyl amine chain, the hydrophobic alkyl amine chain is provided by an alkylamine compound. The modified $MoS_2$ nano material provided by the invention can be formulated into a nanofluid i.e. oil-displacement agent at a lower concentration, and is applied to the tertiary recovery in oil recovery, thereby greatly reducing the environmental pollution in the tertiary recovery, reducing the cost and improving the oil recovery.

10 Claims, 7 Drawing Sheets

MODIFIED MOS₂ NANO MATERIAL, AND PREPARATION METHOD AND USE THEREOF

FIELD OF THE TECHNOLOGY

The invention relates to a nano material and a preparation method thereof, in particular to a modified $MoS_2$ (molybdenum disulfide) nano material, and preparation method and use thereof.

BACKGROUND

According to the forecast of the International Energy Agency, there will be intense demand of oil globally. The current upended oil prices lead to search for a potentially method to enhance the oil production in feasible and economical manner.

In general, oil recovery is done through three stages: primary, secondary and tertiary recovery. The primary recovery mainly relies on the energy of the formation itself to drive the oil flowing underground; as energy of the bottom layer is reduced, saline water (or gas and the like) needs to be injected into the oil layer from the ground surface to drive out the oil, it is called the secondary recovery and about 40% of oil is recovered; during the tertiary recovery, chemicals (such as polymers, $CO_2$, and surfactants) are injected into the ground to drive out the remaining crude oil. The tertiary recovery is an important stage to slow down the aging rate of most oil fields, maintain crude oil production, and increase oil recovery rate. However, serious environmental and economic barriers are the major drawbacks during the tertiary recovery stage.

It is disclosed in the prior art that nanofluid or a gases such as $CO_2$, $N_2$ are injected into an oil reservoir as an EOR agent to recover residual oil. The nanofluid may be a surfactant, a polymer, a foam, a nanoparticle or a combination thereof depending on the reservoir conditions. Surfactants and polymers could recover residual oil by altering wettability, interfacial tension or viscosity of the oil. However, in order to obtain high oil recovery (for example, about 20%), these agents need to be used in a relatively high amount, and the adsorption of these agents on the rock after use could alter the reservoir properties, therefore, there are high cost and environmental pollution problems existing in the use of surfactant and polymer nano-fluids as EOR agent to recover the residual oil.

The technical solution of the use of metal oxide based nanoparticles for the recovery of residual oil in the tertiary recovery stage has also been disclosed in the prior art (Hendraningrat L, Li S, Torscter O A coreflood investigation of nanofluid enhanced oil recovery. J. Pet. Sci. Eng., 2013, 111: 128-138), however, its oil recovery is below 5%.

How to provide a material in the tertiary oil recovery stage to overcome the serious environmental and economic barriers in the tertiary recovery stage, and improve the oil recovery rate need to be solved.

SUMMARY

The present invention provides a modified $MoS_2$ nanomaterial, which is obtained by modifying a hydrophilic molybdenum disulfide ($MoS_2$) nanosheet with an alkylamine compound, and an improved oil recovery can be obtained by using the modified $MoS_2$ nanomaterial-in the tertiary recovery stage and at the same time the costs and environmental pollution also can be reduced during the recovery process.

The present invention also provides a nanofluid, which is obtained by mixing the modified $MoS_2$ nanomaterial with a stabilizer in saline water or deionized water, and the nanofluid can be directly applied in the tertiary recovery stage so as to efficiently recover the remaining oil.

The invention also provides the use of the modified $MoS_2$ nanomaterial and nanofluid in oil recovery.

The invention also provides a method for preparing a hydrophilic $MoS_2$ nanosheet, wherein the prepared hydrophilic molybdenum disulfide ($MoS_2$) sheet has a uniform thickness, which is useful for improving the oil recovery in the tertiary recovery stage.

The invention also provides a method for preparing a modified $MoS_2$ nanomaterial, during which the hydrophilic molybdenum disulfide ($MoS_2$) nanosheet can be effectively modified into a modified the $MoS_2$ nanomaterial with an alkylamine compound, and the oil-water interfacial tension can be reduced by using the modified $MoS_2$ nanomaterial in the tertiary recovery stage, which is beneficial to separate the oil from the rock formation.

The modified $MoS_2$ nanomaterial provided by the invention is comprised of a hydrophilic $MoS_2$ nanosheet linked with hydrophobic alkyl amine chain, the hydrophobic alkyl amine chain is provided by an alkylamine compound.

The modified $MoS_2$ nanomaterial provided by the invention is prepared by the following steps:

adding a hydrophilic $MoS_2$ nanosheet into the organic solution of the alkylamine compound, and stirred at 50-200 rpm for 6-15 hours at 25° C., and collecting a precipitate, the obtained precipitate is the modified $MoS_2$ nanomaterial;

the amount of the hydrophilic $MoS_2$ nanosheet is 1-10 wt % and the amount of the alkylamine compound is 0.1-5 wt % per 100 mL of the organic solution.

In one embodiment of the invention, the alkylamine compound is one or more of butylamine, octylamine and dodecylamine.

In another embodiment of the invention, the modified $MoS_2$ nanomaterial is in the form of nanoscale sheet. Further, the modified $MoS_2$ nanomaterial has a thickness of 1-1.2 nm. Further, a size of the modified $MoS_2$ nanomaterial is 100 nm. Further, the modified $MoS_2$ nanomaterial has a length of 50 nm-100 nm, and a width of 50 nm-100 nm.

The present invention provides a nanofluid (also referred to as an oil-displacement agent) which is obtained by mixing the modified $MoS_2$ nanomaterial with a stabilizer in saline water or deionized water; the amount of the modified $MoS_2$ nano material is 50-1000 ppm and the amount of the stabilizer is 20-1000 ppm per 100 mL of the saline water or deionized water; and the concentration of the saline water is 10000-220000 mg/L. Further, in the technical solution of the invention, the saline water can be obtained according to standard preparation methods of saline water in the field. Further, the saline water also can be an aqueous solution produced according to the following table.

| | |
|---|---|
| $Na_2SO_4$ | 63 mg/L |
| $NaHCO_3$ | 87 mg/L |
| NaCl | 31479 mg/L |
| $CaCl_2$ | 6228 mg/L |
| $MgCl_2$ | 538 mg/L |

In one embodiment of the invention, the stabilizer is one or more of polyvinylpyrrolidone, alkyl polyoxyethylene ether and poly(sodium-p-styrenesulfonate).

In one embodiment of the invention, the modified $MoS_2$ nanomaterial and the stabilizer are mixed in saline or deionized water under ultrasonic condition at a stirring speed of 50-200 rpm.

The invention also provides the use of the modified $MoS_2$ nanomaterial and nanofluid in oil recovery.

Further, the use comprising injecting the nanofluid to a reservoir formation so as to contact with oil, then removing the oil from the reservoir formation by reducing oil interfacial surface tension and changing wettability of the reservoir formation.

The present invention also provides a method of recovering oil from the reservoir formation, comprising injecting the nanofluid to reservoir formation so as to contact with oil, then removing the oil from the reservoir formation by reducing oil interfacial surface tension and changing wettability of the reservoir formation.

Further, the concentration of the modified $MoS_2$ nanomaterial in the nanofluid is 0.005-0.1 wt %. Further, the permeability of core is 8.5-154 mD. Further, the viscosity of the oil that to be recovered is 50 cP.

The invention provides a method of preparing a hydrophilic $MoS_2$ nanosheet, including the following steps:

1) adding a molybdenum source, a sulfur source, and a reducing agent to water to obtain a reaction mixture;

2) stirring the reaction mixture at a speed of 100-500 rpm under 1-5 bar;

3) then reacting reaction mixture at 150-250° C. for 6-15 hours to obtain a precipitate, wherein the obtained precipitate is the hydrophilic $MoS_2$ nanosheet.

Further, in step 1), the amount of the molybdenum source is 30-80 mmol, the amount of the sulfur source is 30-160 mmol, and the amount of the reducing agent is 0.8-1 mol per 100 mL of the water.

Further, the molybdenum source is one or more of ammonium molybdate, molybdenum pentachloride and molybdenum oxide; the sulfur source is one or more of thioacetamide, sodium sulfonate and potassium thiocyanate; the reducing agent is one or more of urea, ascorbic acid and hydrazine.

In the above method, the reducing agent not only can be used to control the pH of the mixture to 7-9, but also to promote the reaction between the molybdenum source and the sulfur source so as to form $MoS_2$.

Further, the step 3) further comprises: washing the precipitate (optionally, after the precipitate is collected and cooled to room temperature, for example, about 25° C.) with water and ethanol (for example, 1 L each), and then drying the precipitate (for example, drying the precipitate for about 6 hours at 80° C.) to obtain the hydrophilic $MoS_2$ nanosheet.

The invention provides a method for preparing a modified $MoS_2$ nanomaterial, including the following steps:

1) adding a molybdenum source, a sulfur source, and a reducing agent into water to obtain a reaction mixture;

2) stirring the reaction mixture at a speed of 100-500 rpm under 1-5 bar;

3) then reacting the reaction mixture at 150-250° C. for 6-15 hours to obtain a precipitate, the obtained precipitate is the hydrophilic $MoS_2$ nanosheet;

4) adding the hydrophilic $MoS_2$ nanosheet obtained in the 3) into an organic solution of alkylamine compound, stirring at 50-200 rpm for 6-15 hours at 25° C., and collecting a precipitate, the obtained precipitate is the modified $MoS_2$ nanomaterial; wherein the amount of the hydrophilic $MoS_2$ nanosheet is 1-10 wt % and the amount of the alkylamine compound is 0.1-5 wt % per 100 mL of the organic solution.

Further, in the 1), the amount of the molybdenum source is 30-80 mmol, the amount of the sulfur source is 30-160 mmol, and the amount of the reducing agent is 0.8-1 mol per 100 mL of the water.

In the method of preparing a modified $MoS_2$ nanomaterial provided by the present invention, the step 4) further comprises: washing the obtained precipitate (optionally, after the precipitate is collected and cooled to room temperature, for example, about 25° C.) with water and ethanol (for example, 1 L each), followed by drying the precipitate (for example, drying the precipitate at 50-80° C. for about 6-12 hours) to obtain the modified $MoS_2$ nanomaterial.

Further, the organic solution of the alkylamine compound is usually an anhydrous ethanol or toluene solution of the alkylamine compound.

Further, the molybdenum source is one or more of ammonium molybdate, molybdenum pentachloride and molybdenum oxide; the sulfur source is one or more of thioacetamide, sodium sulfonate and potassium thiocyanate; the reducing agent is one or more of urea, ascorbic acid and hydrazine.

As a basic knowledge in the field, molybdenum disulfide ($MoS_2$) is one of the family members of the two-dimensional transition metal dichalcogenide (TMD). It is hydrophobic in its natural state and has many fascinating properties such as high carrier mobility and bandgap tunability and photoconductivity, and has a wide range of applications in the field of optoelectronics. $MoS_2$ has two types of structures, one is $2H-MoS_2$ which is trigonal, and possesses hydrophobic behavior; the other is $1T-MoS_2$ which is octahedral in structure and possesses hydrophilic behavior.

The present invention provides the synthesis of hydrophilic $MoS_2$ nanosheets (i.e., $1T-MoS_2$ nanosheets). The hydrophilic $MoS_2$ nanosheet synthesized by the method of preparing the hydrophilic $MoS_2$ nanosheet provided by the present application has a uniform thickness, which is helpful for the modified $MoS_2$ nanomaterial (possesses amphiphilicity) obtained by modifying the hydrophilic $MoS_2$ nanosheet with the alkylamine compound being used to efficiently recover the remaining oil in the tertiary recovery stage.

The solution of the invention has the following advantages:

1. The modified $MoS_2$ nanomaterial provided by the invention can be used in the tertiary recovery stage at a lower concentration (50-1000 ppm, i.e. 0.005-0.1 wt %), and the oil recovery rate is significantly improved (that is, 13.8%-20.5%). The cost of recovery is also greatly reduced compared to using expensive surfactants (for example, 1 ton of surfactant cost about $3,000, while 1 ton of modified $MoS_2$ nanomaterial costs about $150). And unlike surfactants and polymers, the modified $MoS_2$ nanomaterial is not harmful for water thus the environmental pollution during the recovery process can be reduced.

2. The modified $MoS_2$ nanomaterial provided by the present invention also has a high oil recovery rate even at a low permeable core (for example, 8.5-8.7 mD) with high oil viscosity (for example, 50 cP).

3. A uniform thickness of the hydrophilic $MoS_2$ nanosheet can be produced by the method of preparing a hydrophilic $MoS_2$ nanosheet provided by the present invention, so that the modified $MoS_2$ nanomaterial (having amphiphilicity) obtained by modification of the hydrophilic $MoS_2$ nanosheet with an alkylamine compound also has a uniform thickness, which is helpful for the efficient recovery of the remaining oil in the tertiary recovery stage.

DETAILED DESCRIPTION

Example 1

Preparation of the Modified $MoS_2$ Nanomaterial of the Invention 1) adding ammonium molybdate (molybdenum source), potassium thiocyanate (sulfur source) and ascorbic acid (reducing agent) into water to obtain a reaction mixture; wherein the amount of the molybdenum source is 70 mmol, the amount of the sulfur source is 140 mmol, and the amount of the reducing agent is 1 mol per 100 mL of water;

2) stirring the reaction mixture at 450 rpm in a hydrothermal autoclave for 1-3 hours at a pressure of 3 bar;

3) then reacting the reaction mixture at 180° C. for 12 hours to obtain a precipitate, after the obtained precipitate is collected and cooled to room temperature, washed with water and ethanol, and then dried at 80° C., the resulting precipitate is the hydrophilic $MoS_2$ nanosheet;

4) adding the hydrophilic $MoS_2$ nanosheet obtained in step 3) into an anhydrous ethanol solution of dodecylamine, and stirring at 60 rpm for 15 hours at 25° C., wherein the amount of the hydrophilic $MoS_2$ nanosheet is 3 wt %, the amount of the dodecylamine is 0.5 wt % per 100 mL of the anhydrous ethanol solution, and collecting a precipitate, the obtained precipitate is washed with water and ethanol, and then dried at 80° C. for about 6 hours, the resulting precipitate is the modified $MoS_2$ nanosheet.

The hydrophilic $MoS_2$ nanosheets and modified $MoS_2$ nanosheets are identified by the conventional methods in the art.

Figure 1:
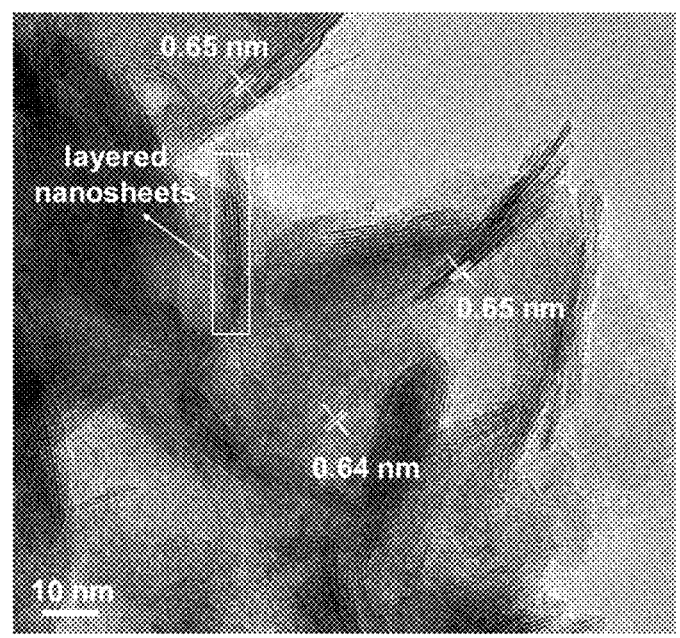
FIG. 1 shows a high resolution TEM (transmission electron microscope) image of hydrophilic $MoS_2$ nanosheet (1T-$MoS_2$) prepared in accordance with the present invention.

The high-resolution transmission electron microscope is performed to examine the structure of the hydrophilic $MoS_2$ nanosheets of the present invention. FIG. 1 shows a high resolution TEM (transmission electron microscope) image of a hydrophilic $MoS_2$ nanosheet prepared in accordance with the present invention. The rectangular area in FIG. 1 shows the edge of the hydrophilic $MoS_2$ nanosheet with multiple layers. It can be seen that the spacing between the layers is 0.64-0.65 nm, which is consistent with the known interlayer spacing of $MoS_2$ (0.64 nm).

Figure 2:
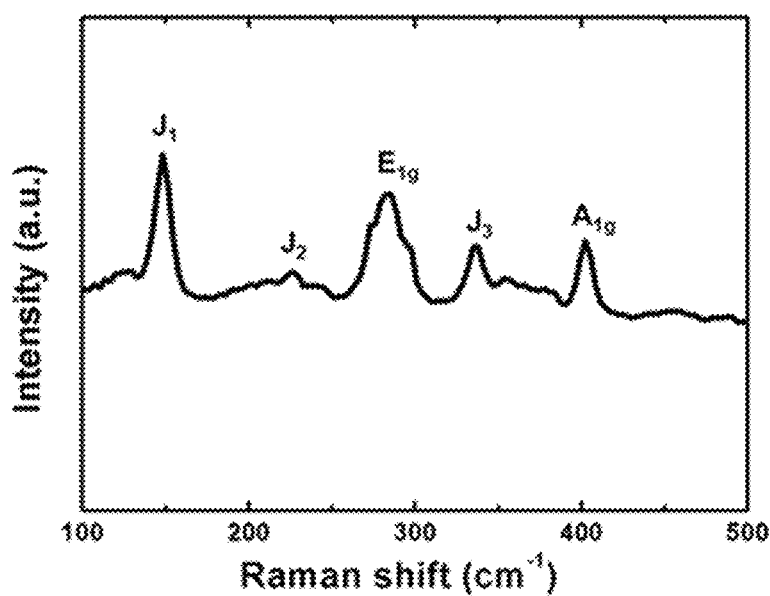
FIG. 2 shows the Raman spectrum of the hydrophilic $MoS_2$ nanosheet (1T-$MoS_2$) prepared in accordance with the present invention.

Raman spectroscopy is used to determine the polymorphic nature of the synthesized nanosheets. FIG. 2 shows the raman spectrum of the hydrophilic $MoS_2$ nanosheet (1T-$MoS_2$) prepared in accordance with the present invention. In FIG. 2, the $E_{1g}$ and $A_{1g}$ vibration modes observed at 284 $cm^{-1}$ and 407 $cm^{-1}$ proves the presence of 1T-$MoS_2$ having an octahedral structure. The vibrational modes observed at 146 $cm^{-1}$($J_1$), 226 $cm^{-1}$($J_2$) and 333 $cm^{-1}$($J_3$) proves the presence of a superlattice on the basal plane of single layer $MoS_2$, indicating the prepared hydrophilic $MoS_2$ nanosheet in accordance with the present invention is 1T-$MoS_2$.

Figure 3:
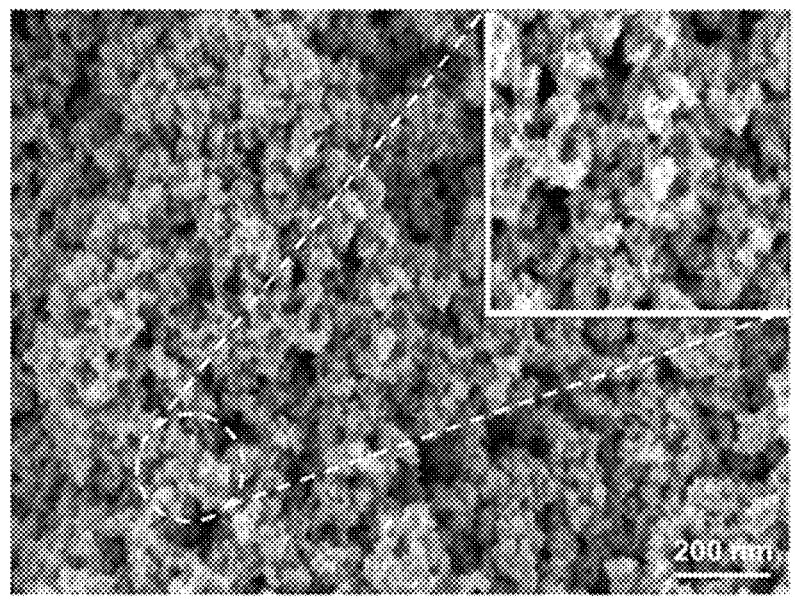
FIG. 3 shows an SEM (scanning electron microscope) image of the modified $MoS_2$ nanosheet prepared in accordance with the present invention.

FIG. 3 shows an SEM (scanning electron microscope) image of the modified $MoS_2$ nanosheet prepared in accordance with the present invention. It can be seen that the modified $MoS_2$ nanosheet has a size of about 100 nm, and the zoomed area shows that the modified $MoS_2$ nanosheet resembles like coral reef.

Figure 4A:
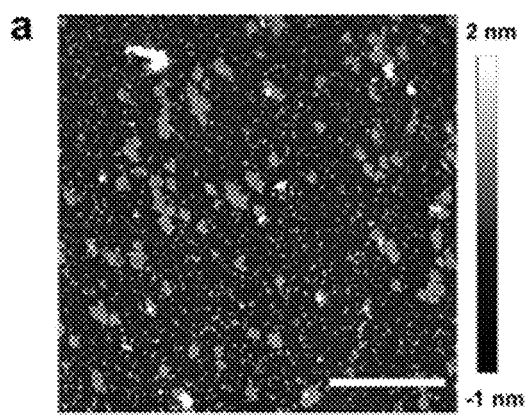
FIG. 4A shows an AFM (atomic force microscope) image of modified $MoS_2$ nanosheets prepared in accordance with the present invention.
Figure 4B:
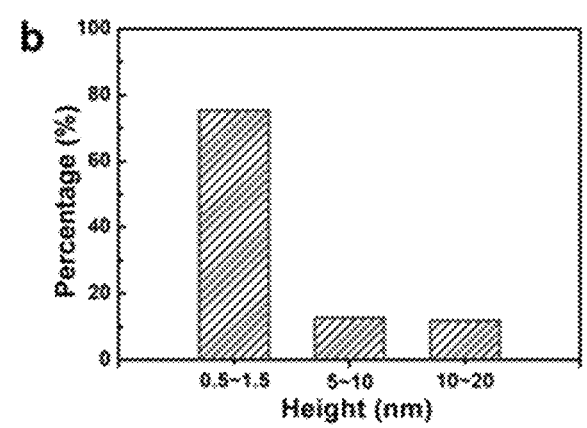
FIG. 4B shows a histogram of thickness across various location of the AFM image of FIG. 4A.

AFM images are used to show the thickness characteristics of the nanosheet. FIG. 4A shows an AFM (atomic force microscope) image of the modified $MoS_2$ nanosheet prepared in accordance with the present invention, a typical tapping mode AFM image of the modified $MoS_2$ nanosheet deposited on a $SiO_2$ substrate by spin coating can be seen from FIG. 4A. FIG. 4B shows a histogram of thickness across various location of the AFM image of FIG. 4A. It can be seen from FIG. 4B, the measured thickness of the modified $MoS_2$ nanosheet is found to be around 1 to 1.2 nm across various location.

Figure 5:
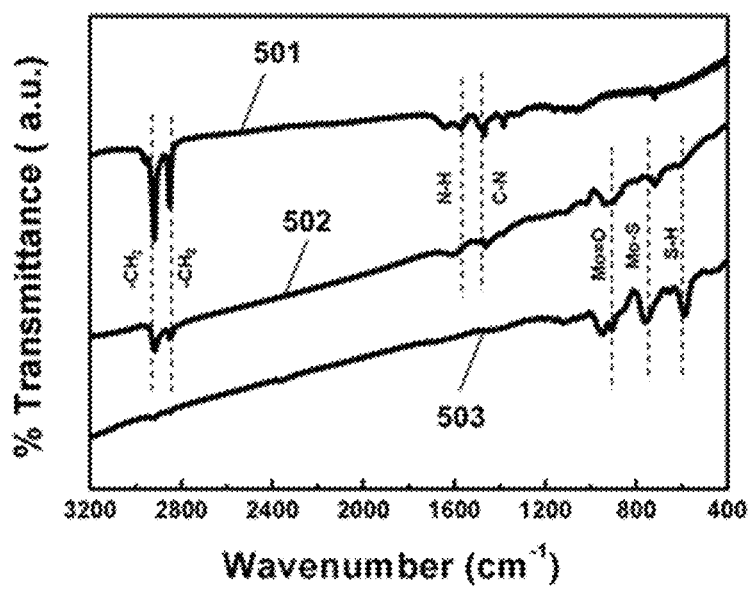
FIG. 5 shows the FTIR spectrum of the three materials of the present invention.

FIG. 5 shows the FTIR spectrum of the three materials of the present invention. Wherein 501 shows the spectrum of the alkyl amine compound, the bands at 2922 $cm^{-1}$ and 2853 $cm^{-1}$ are the asymmetric and symmetric vibrations of —$CH_2$ in the alkyl amine group, respectively, and the peak at 1572 $cm^{-1}$ is due to the N—H scissoring of the amine group, while 1470 $cm^{-1}$ was due to C—N stretch of the amide. 502 shows the spectrum of the modified $MoS_2$ nanosheets, indicating that the alkyl amine chain is located on the surface of the nanosheet. 503 shows the FTIR spectrum of $MoS_2$, the peaks at ~420 $cm^{-1}$, ~620 $cm^{-1}$, ~761 $cm^{-1}$, ~908-956 $cm^{-1}$ represent the out-of-plane vibration of S atom, the vibration of S—H, the vibration of Mo—S, and vibration of Mo=O.

Example 2

Preparation of the Modified $MoS_2$ Nanomaterial of the Invention 1) adding molybdenum pentachloride (molybdenum source), sodium sulfonate (sulfur source) and hydrazine (reducing agent) into water to obtain a reaction mixture; the amount of the molybdenum source is 30 mmol, and the amount of the sulfur source is 30 mmol, the amount of the reduction agent is 0.8 mol per 100 mL of water;

2) stirring the reaction mixture at 250 rpm for 1-3 hours under an oil bath at a pressure of 5 bar;

3) then reacting the reaction mixture at 200° C. for 8 hours to obtain a precipitate, and the obtained precipitate is collected and cooled to room temperature, washed with water and ethanol, and then dried at 80° C. for about 6-8 hours, the resulting precipitate is the hydrophilic $MoS_2$ nanosheet.

4) adding the hydrophilic $MoS_2$ nanosheet obtained in step 3) into an anhydrous ethanol solution of butylamine, and stirring at 100 rpm for 12 hours at 25° C., wherein the amount of the hydrophilic $MoS_2$ nanosheet is 5 wt %, the amount of the butylamine was 1 wt % per 100 mL of the anhydrous ethanol solution, and collecting a precipitate, the obtained precipitate is washed with water and ethanol, and then dried at 80° C. for about 8 hours, the resulting precipitate is the modified $MoS_2$ nanosheet.

The surface properties of the hydrophilic $MoS_2$ nanosheets and modified $MoS_2$ nanosheets are measured using the contact angle measurement. Generally, a surface having a contact angle between 0° and 90° is a hydrophilic surface, and a surface having a contact angle of 90° to 180° is a hydrophobic surface. The octahedral arrangement of Mo and S atoms results in the $MoS_2$ nanosheet having a contact angle of 42° and reflects the hydrophilic behavior (FIG. 6A).

Figure 6A:
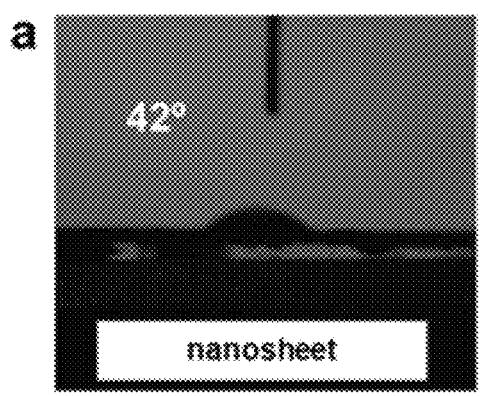
FIG. 6A shows the static contact angle of the hydrophilic $MoS_2$ nanosheet prepared by the present invention with 5 μL of water droplets.
Figure 6B:
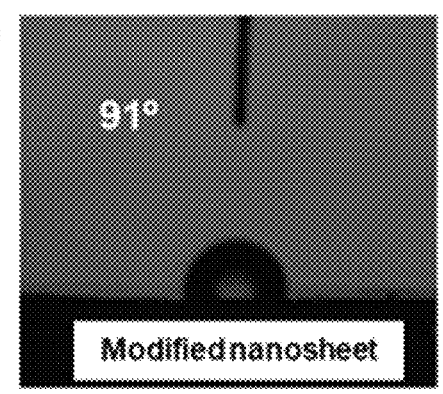
FIG. 6B shows the static contact angle of the modified $MoS_2$ nanomaterial prepared by the present invention with 5 μL of water droplets.

FIG. 6A shows the static contact angle of the hydrophilic $MoS_2$ nanosheet of the present invention with 5 μL of the water droplet; FIG. 6B shows the static contact angle of the modified $MoS_2$ nanomaterial of the present invention with 5 μL of the water droplet, and it can be seen that the contact angle was changed to 91° after modification with an alkylamine, which resulted in the $MoS_2$ nanosheets possess amphiphilicity after the modification (FIG. 6B).

Example 3

Preparation of Modified $MoS_2$ Nanomaterial of the Invention 1) adding molybdenum oxide (molybdenum source), thioacetamide (sulfur source) and urea (reducing agent) into water to obtain a reaction mixture; the amount of the molybdenum source is 50 mmol, the amount of the sulfur source is 100 mmol, and the amount of the reducing agent is 1 mol per 100 mL of water;

2) stirring the reaction mixture at 500 rpm for 1-3 hours at 200° C. under a pressure of 1 bar;

3) then reacting the reaction mixture at 250° C. for 14 hours to obtain a precipitate, and the obtained precipitate is collected and cooled to room temperature, washed with water and ethanol, and then dried at 80° C. for about 9 hours, the resulting precipitate is the hydrophilic $MoS_2$ nanosheet.

4) adding the hydrophilic $MoS_2$ nanosheet obtained in step 3) into a toluene solution of octylamine, and stirring at 180 rpm for 6 hours at 25° C., wherein the amount of the hydrophilic $MoS_2$ nanosheet is 10 wt %, the amount of the octylamine is 5 wt % per 100 mL of the toluene solution, and the collecting a precipitate, the obtained precipitate is washed with water and ethanol, and then dried at 80° C. for about 10 hours, the resulting precipitate is the modified $MoS_2$ nanosheet (that is, amphoteric $MoS_2$ nanosheets).

Figures 7A, 7B, 7C:
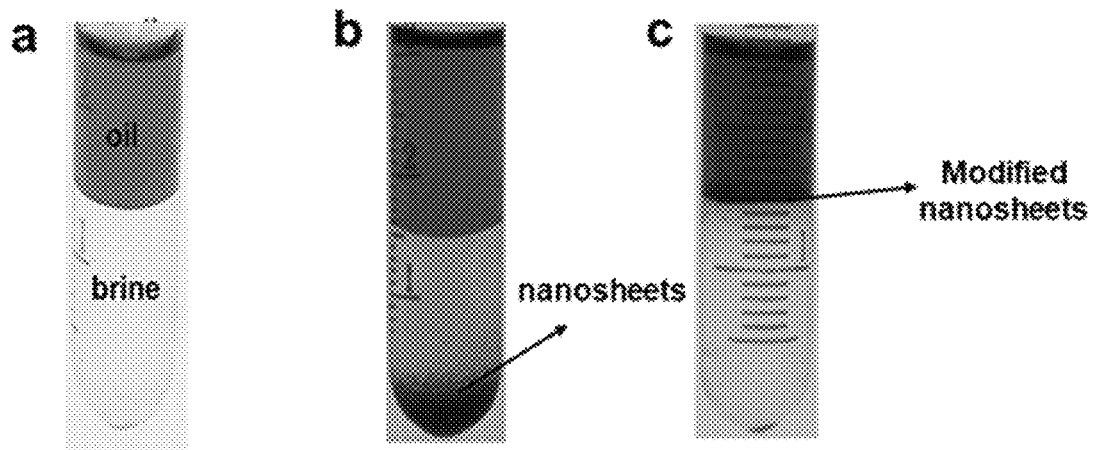
FIG. 7A shows an oil/saline system in a test tube without the addition of $MoS_2$ at the oil/saline water interface.
FIG. 7B shows the oil/saline system in a test tube with the addition of the hydrophilic $MoS_2$ nanosheets prepared in accordance with the present invention at the oil/saline water interface.
FIG. 7C shows an oil/saline system in a test tube with the addition of the modified $MoS_2$ nanosheets prepared in accordance with the present invention at the oil/saline water interface.

The hydrophilic $MoS_2$ nanosheets and the amphoteric $MoS_2$ nanosheets prepared in this example are used to test on the oil/saline water interface. FIG. 7A shows an oil/saline system in a test tube without the addition of $MoS_2$ at the oil/saline water interface; FIG. 7B shows the oil/saline system in a test tube with the addition of the hydrophilic $MoS_2$ nanosheets prepared in accordance with the present invention at the oil/saline water interface; FIG. 7C shows an oil/saline system in a test tube with the addition of the modified $MoS_2$ nanosheets prepared in accordance with the present invention at the oil/saline water interface. Due to the high interfacial surface tension between the oil and saline water, a concave interface is generated at the oil/saline water interface, as shown in FIG. 7A. When the modified $MoS_2$ nanosheets prepared according to the present invention were gently injected to the oil/saline water system, the interfacial tension was reduced and the concave region of oil/saline water interface is transformed to flat, as shown in FIG. 7C. When the unmodified nanosheets (that is the hydrophilic $MoS_2$ nanosheets) are injected to the oil/saline water system, the hydrophilic $MoS_2$ nanosheets dispersed in the saline water and settle down a few minutes later, as shown in FIG. 7B.

Example 4

1. The Preparation of Nanofluids

1) Preparation of nanofluid 801: it is obtained by mixing the modified $MoS_2$ nanomaterial with the polyvinylpyrrolidone (stabilizer) in deionized water; the amount of the modified $MoS_2$ nanomaterial is 500 ppm (i.e. 0.05 wt. %) and the amount of the stabilizer is 1000 ppm per 100 mL of deionized water, the nanofluid was named as nanofluid 801.

2) The method of preparing the nanofluid 802 is the same as that of nanofluid 801, except that the amount of the modified $MoS_2$ nanomaterial is 1000 ppm (i.e., 0.1 wt %), and the amount of the stabilizer is 100 ppm, the stabilizer agent is poly (sodium-p-styrenesulfonate).

3) The method of preparing the nanofluid 803 is the same as that of the nanofluid 801, except that the amount of the modified $MoS_2$ nanomaterial is 50 ppm (i.e., 0.005 wt %), and the amount of the stabilizer is 50 ppm, the stabilizer agent is alkyl polyoxyethylene ether.

4) The method of preparing the nanofluid 901 is the same as that of the nanofluid 801, except that the deionized water is replaced with saline water, and the concentration of the saline water is 10000 mg/L.

5) The method of preparing the nanofluid 902 is the same as that of the nanofluid 802, except that the deionized water is replaced with saline water, and the concentration of the saline water is 10000 mg/L.

6) The method of preparing the nanofluid 903 is the same as that of the nanofluid 803, except that the deionized water is replaced with saline water, and the concentration of the saline water is 10000 mg/L, and the modified $MoS_2$ nanomaterial and the stabilizer are mixed in saline or deionized water under ultrasonic condition at a stirring speed of 50-200 rpm.

7) The nanofluid 803', the method of preparing the nanofluid 803' is the same as that of the nanofluid 803, except that the stabilizer is not used in the preparation process.

8) The nanofluid 903', the method of preparing the nanofluid 903' is the same as that of the nanofluid 903, except that the stabilizer is not used in the preparation process.

II. Interfacial Tension and Stability of Nanofluids

The interfacial tension between the oil and the nanofluid prepared above is tested using a tensiometer at 30° C. The stability of the nanofluid of the present invention was measured by transmission and backscattering of pulsed near-infrared light (λ=880 nm) by using a Turbiscan Lab Expert of Formulaction. The Stability Dynamics Index (TSI) is used to evaluate the stability of nanofluids. A higher TSI value indicates a less stable fluid.

Figure 8:
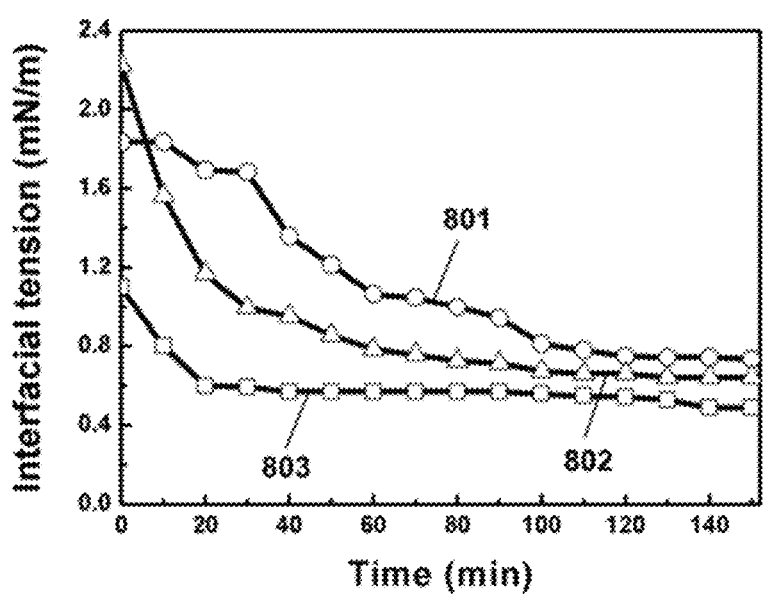
FIG. 8 shows an interfacial tension vs. time plot of nanofluids 801-803 (nanofluids prepared using deionized water).

FIG. 8 shows an interfacial tension vs. time plot of nanofluids 801-803 (nanofluids prepared using deionized water). It is apparent from FIG. 8, the nanofluid 803 achieves a minimum interfacial surface tension of 0.5 mN/m.

Figure 9:
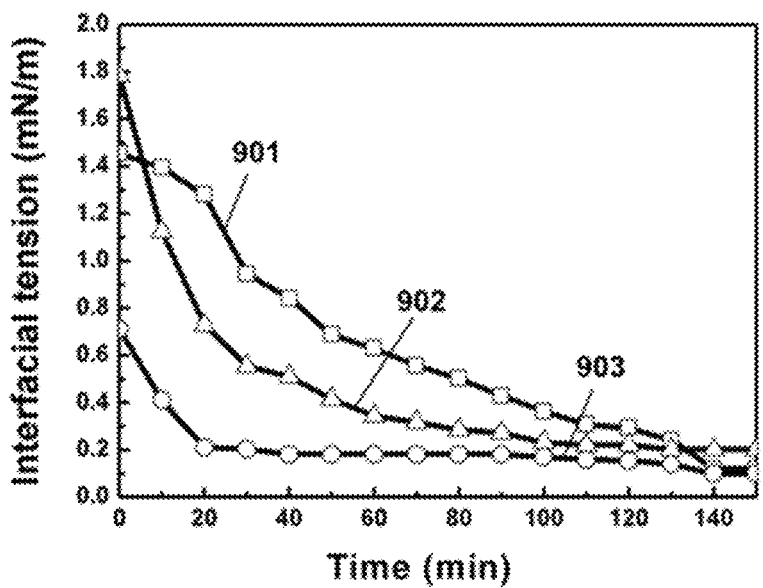
FIG. 9 shows an interfacial tension vs. time plot of nanofluids 901-903 (nanofluids prepared using saline water).

FIG. 9 shows an interfacial tension vs. time plot of nanofluids 901-903 (nanofluids prepared using saline water). It is apparent from FIG. 9, the nanofluid 903 achieves a minimum interfacial surface tension of 0.1 mN/m.

Figure 10:
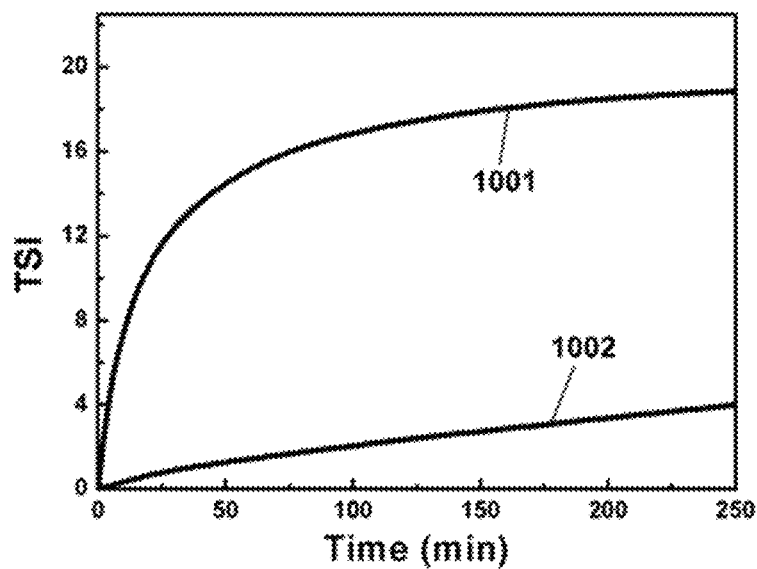
FIG. 10 shows the stability of the nanofluid 803.

FIG. 10 shows the stability of the nanofluid 803. The curve 1001 represents the TSI value curve of the nanofluid 803' (the nanofluid 803' differs from the nanofluid 803 in that the preparation process does not use a stabilizer), and the curve 1002 represents the TSI value curve of the nanofluid 803. 1002 shows less TSI values, which indicates the better stability performance compared to 1001.

Figure 11:
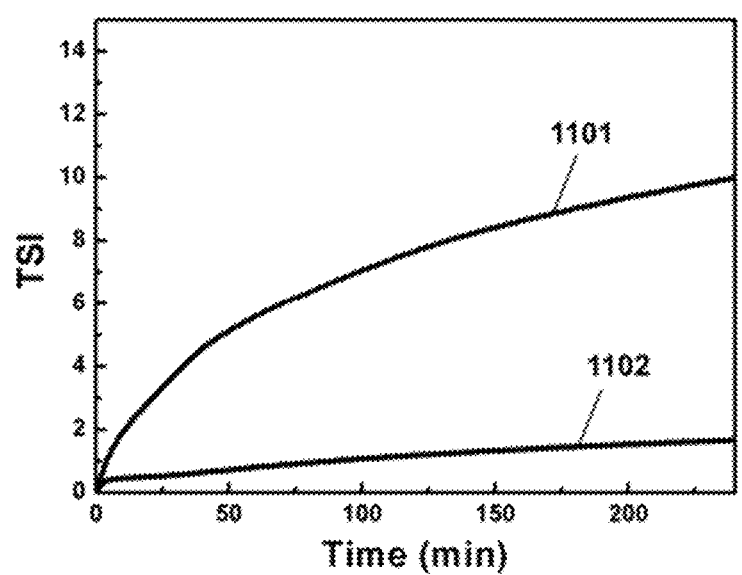
FIG. 11 shows the stability of the nanofluid 903.

FIG. 11 shows the stability of the nanofluid 903. The curve 1101 represents the TSI value curve of the nanofluid 903' (the nanofluid 903' differs from the nanofluid 903 in that the preparation process does not use a stabilizer), and the curve 1102 represents the TSI value curve of the nanofluid 903. 1102 shows less TSI values, which indicates the better stability performance compared to 1101.

As can be seen from FIGS. 10-11, the nanofluid prepared using saline water can achieve better stability after using the stabilizer. Therefore, the nanofluid of the present invention can be prepared with the seawater present near the reservoirs which leads to the decrease in cost of the water consumption.

Example 5

The core flooding experiment was carried out by using the nanofluid 803 and nanofluid 903 synthesized in the present invention to verify the oil recovery rate of the modified $MoS_2$ nanomaterial of the present invention in the tertiary recovery stage.

Figure 12:
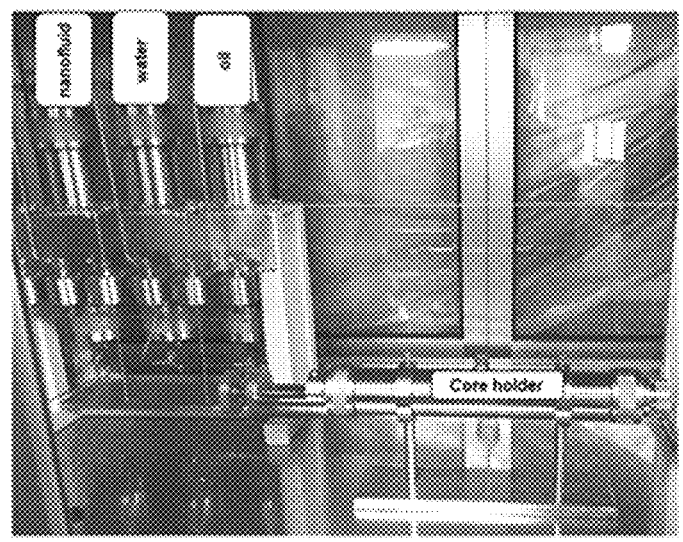
FIG. 12 shows the core flooding experimental setup.

Core flooding experiments are done using man-made sandstone cores and tested in the flooding equipment (shown in FIG. 12). The physical properties of the core samples are shown in Table 1. Before flooding, the cores are all cleaned throughout and saturated in water for 24 hours. Then the oil having a viscosity of 50 cP (high viscosity oil) is pumped into the core so that no more water is flowing out (i.e., the core is 100% saturated with oil). After the oil saturation, water was injected at a rate of 0.5 mL/min until no more oil is recovered (secondary flooding). Finally, the nanofluid was pumped into the core at a rate of 0.5 mL/min until the remaining oil is recovered (tertiary flooding).

TABLE 1

Physical properties of core samples

| Name of the core | Length of the core (cm) | Diameter of the core (cm) | Average fluid permeability (mD) | Porosity (%) | Pore volume (cm³) |
|---|---|---|---|---|---|
| L1 | 10.02 | 5.02 | 8.7 | 13.050 | 6.40 |
| H1 | 10.01 | 5.01 | 154 | 21.343 | 8.9 |
| L2 | 10.01 | 5.00 | 8.65 | 13.106 | 6.43 |
| H2 | 10.02 | 5.05 | 149.65 | 19.160 | 9.5 |
| L3 | 10.00 | 5.00 | 8.5 | 13.030 | 6.30 |
| H3 | 10.01 | 5.01 | 150 | 20.01 | 8.7 |

TABLE 2

Core flooding experiment results

| Type of the nanofluid | Name of core | Average fluid permeability (mD) | Oil recovery rate of secondary flooding (%) | Oil recovery rate of tertiary flooding (%) | Total oil recovery (%) |
|---|---|---|---|---|---|
| nanofluid prepared from $SiO_2$ nanoparticles (0.01 wt %) | L1 | 8.7 | 46.65 | 1.60 | 48.25 |
| | H1 | 154 | 49.80 | 4.45 | 54.25 |
| Nanofluid 803 (0.005 wt %) | L2 | 8.65 | 47.50 | 16.25 | 63.75 |
| | H2 | 149.65 | 49.41 | 12.94 | 62.35 |
| Nanofluid 903 (0.005 wt %) | L3 | 8.5 | 46.80 | 20.50 | 67.30 |
| | H3 | 150 | 48.04 | 13.80 | 61.84 |

The data in Table 2 indicates that for high viscosity oil (e.g., 50 cP), using the nanofluids prepared by the modified $MoS_2$ nanomaterials provided by the present invention (where the modified $MoS_2$ nanomaterials are only used at a concentration of 0.005 wt %), both the low permeability core (e.g., 8.5-8.7 mD) and high permeability cores (e.g., 149-154 mD) have higher oil recovery rates of 13.8%-20.5% in tertiary flooding; whereas oil recovery rates of the nanofluid prepared from $SiO_2$ nanoparticles of the prior art (produced by dissolving $SiO_2$ nanoparticles in water, the final concentration of $SiO_2$ nanoparticles is 0.01 wt %, and the $SiO_2$ nanoparticles are purchased from Sigma Aldrich) is only 1.6-4.45%.

Further, nanofluids prepared from prior art $SiO_2$ nanoparticles achieve higher oil recovery in high permeability cores (e.g., 154 mD), while the modified $MoS_2$ nanomaterials provided by the present invention have unexpectedly higher oil recovery in low permeability cores. (e.g., 8.5-8.65 mD).

Figure 13:
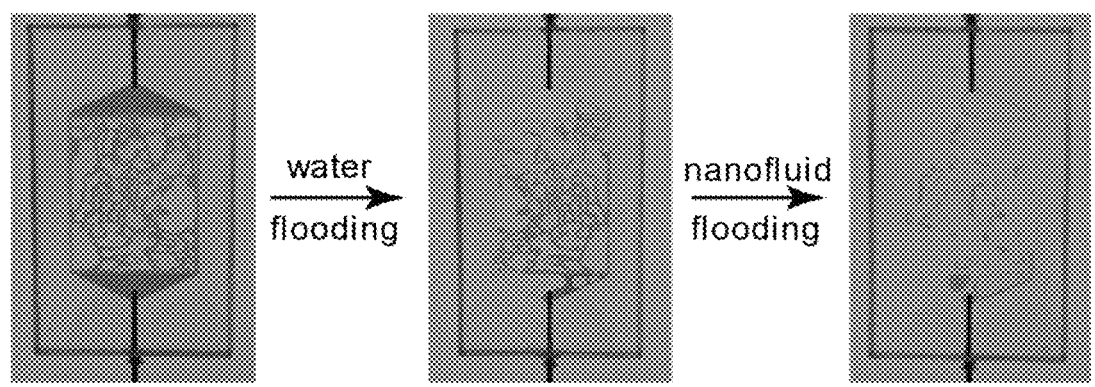
FIG. 13 shows a visual model of oil recovery.

The applicant also provides a visual model of oil recovery that using the nanofluid of the present invention, as shown in FIG. 13. It can be seen from the model, the nanofluid of the present invention has a very significant recovery effect on oil in a low permeability region, the model is designed through a laser lithography technique. The geometry of the model is designed from the SEM cross section of the low permeability sandstone cores L3 (eg 8.5 mD). The three images in FIG. 13 from left to right are model images before water flooding, after water blooding and after nanofluid flooding, which clearly shows that the remaining oil in the low permeability region after the nanofluid of the present invention flooding is efficiently recovered.

Using nanofluids 801-802, 901-902 obtained from the modified $MoS_2$ nanomaterials of the present invention to recover low viscosity crude oil, the oil recovery also can be significantly improved as that achieved for the high viscosity crude oil.

What is claimed is:
1. A modified $MoS_2$ nanomaterial, characterized in that the modified $MoS_2$ nanomaterial is comprised of a hydrophilic $MoS_2$ nanosheet linked with hydrophobic alkyl amine chain, the hydrophobic alkyl amine chain is provided by an alkylamine compound;
and the modified $MoS_2$ nanomaterial is prepared by the following steps:
1) adding a molybdenum source, a sulfur source, and a reducing agent into water to obtain a reaction mixture;

2) stirring the reaction mixture at a speed of 100-500 rpm under 1-5 bar;
3) then reacting the reaction mixture at 150-250° C. for 6-15 hours to obtain a precipitate, the obtained precipitate is the hydrophilic $MoS_2$ nanosheet;
4) adding the hydrophilic $MoS_2$ nanosheet obtained in step 3) into an organic solution of alkylamine compound, stirring at 50-200 rpm for 6-15 hours at 25° C., and collecting a precipitate, the obtained precipitate is the modified $MoS_2$ nanomaterial; wherein the amount of the hydrophilic $MoS_2$ nanosheet is 1-10 wt % and the amount of the alkylamine compound is 0.1-5 wt % per 100 mL of the organic solution.

2. The modified $MoS_2$ nanomaterial according to claim 1, wherein the alkylamine compound is one or more of butylamine, octylamine and dodecylamine.

3. The modified $MoS_2$ nanomaterial according to claim 1, wherein the modified $MoS_2$ nanomaterial is in the form of nanoscale sheet.

4. The modified $MoS_2$ nanomaterial according to claim 3, wherein the modified $MoS_2$ nanomaterial has a thickness of 1-1.2 nm.

5. The modified $MoS_2$ nanomaterial according to claim 3, wherein a size of the modified $MoS_2$ nanomaterial is 100 nm.

6. A nanofluid, characterized in that the nanofluid is obtained by mixing the modified $MoS_2$ nanomaterial of claim 1 with a stabilizer in saline or deionized water;
the amount of the modified $MoS_2$ nano material is 50-1000 ppm and the amount of the stabilizer is 20-1000 ppm per 100 mL of the saline water or deionized water;
the concentration of the saline water is 10,000-220000 mg/L.

7. The nanofluid according to claim 6, wherein the stabilizer is one or more of polyvinylpyrrolidone, alkyl polyoxyethylene ether and poly (sodium-p-styrenesulfonate).

8. The nanofluid according to claim 6, wherein the modified $MoS_2$ nanomaterial and the stabilizer are mixed in saline or deionized water under ultrasonic condition at a stirring speed of 50-200 rpm.

9. Use of the nanofluid of claim 6 in oil recovery.

10. The use according to claim 9, comprising injecting the nanofluid to a reservoir formation so as to contact with oil, then removing the oil from the reservoir formation by reducing oil interfacial surface tension and changing wettability of the reservoir formation.

* * * * *